O. G. WORSLEY.
SPRING WHEEL.
APPLICATION FILED MAY 9, 1918.
1,281,737.
Patented Oct. 15, 1918.
2 SHEETS—SHEET 2.
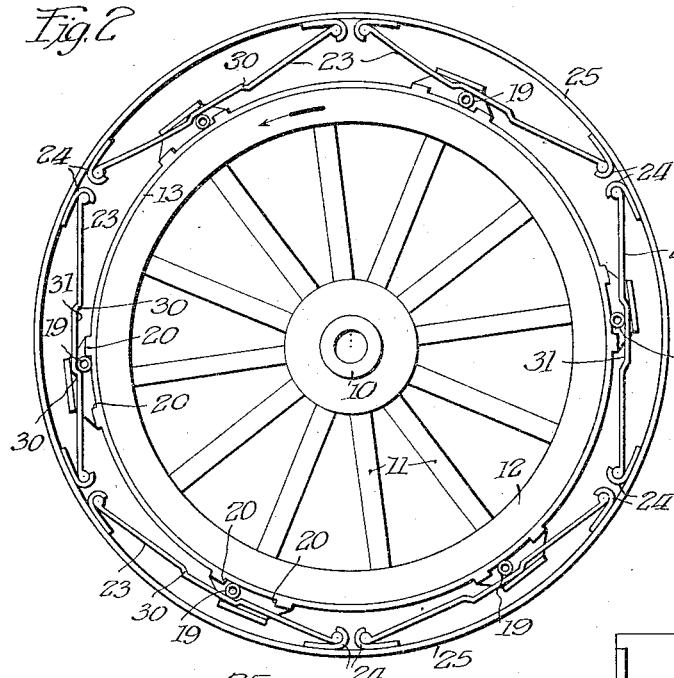
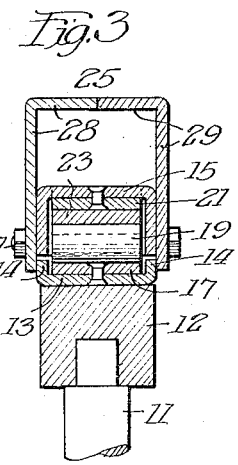
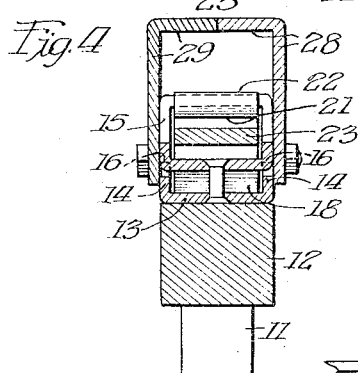
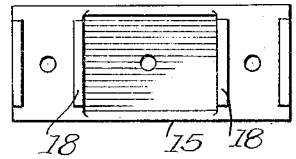
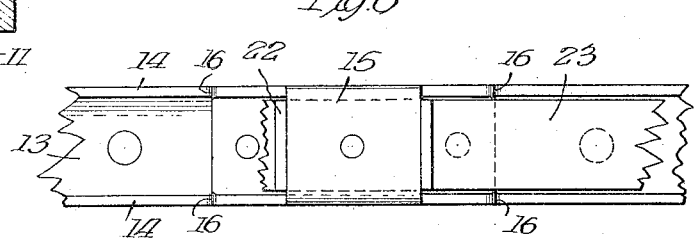
Witness:
Leonard W. Novander
Inventor
Otto G. Worsley
By E. J. Andrews
Atty

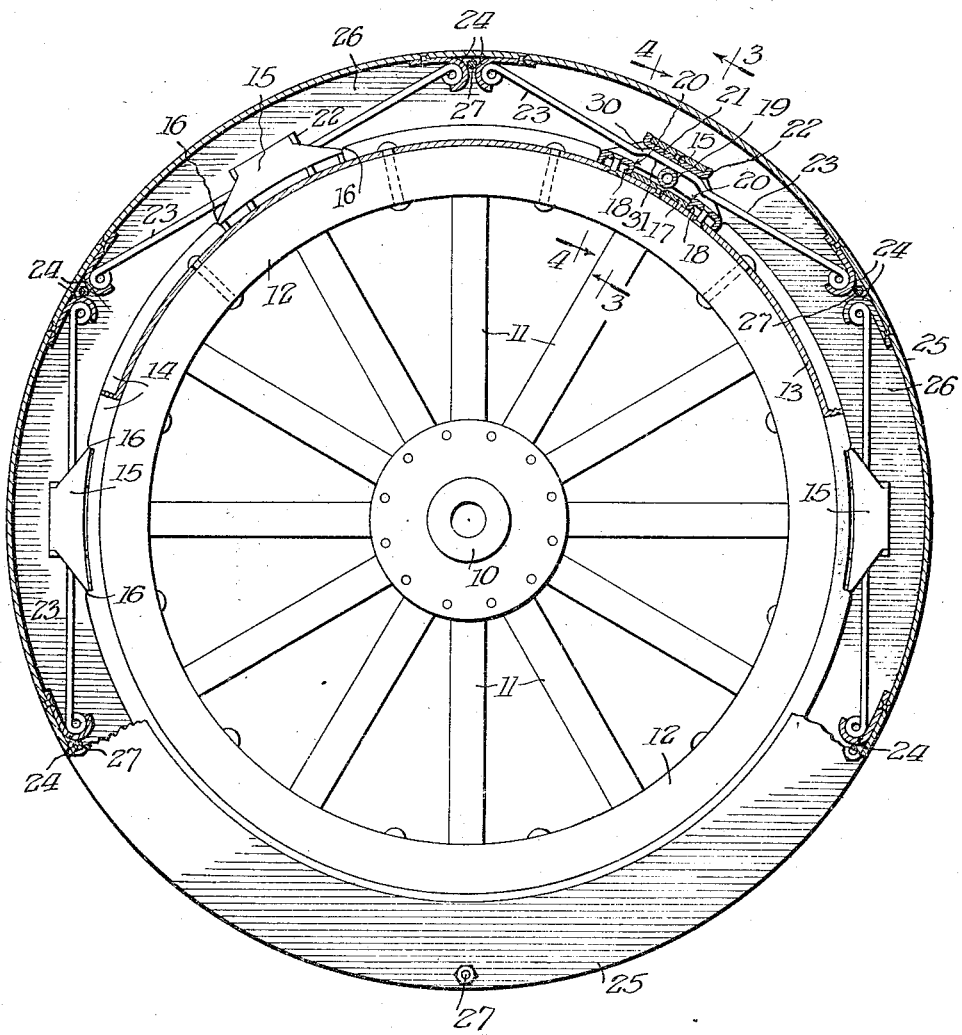

UNITED STATES PATENT OFFICE.

OTTO G. WORSLEY, OF CHICAGO, ILLINOIS.

SPRING-WHEEL.

1,281,737.
Specification of Letters Patent.   Patented Oct. 15, 1918.

Application filed May 9, 1918.   Serial No. 233,436.

*To all whom it may concern:*

Be it known that I, OTTO G. WORSLEY, a citizen of the United States, residing at Chicago, in the county of Cook and State of Illinois, have invented certain new and useful Improvements in Spring-Wheels, of which the following is a specification.

This invention relates to wheels to be used on vehicles of various classes, particularly to wheels the resiliency of which depends upon springs.

It is well understood that in case of automobiles traveling over rough roads, particularly at a high rate of speed, and also in case of trucks carrying heavy loads, the resilient portion of the wheel in practice has at least four functions: one, to provide a radial cushioning effect between the road-bed and the rigid or central portion of the wheel; another function is to provide shock absorbing means to overcome the effects of the rebound of the rigid portion of the wheel from the outer rim in case of sudden jars; another function is to provide for torsional stresses between the inner and outer rims of the wheel; and another function is to provide for transverse or side stress between the two rims. One object of this invention is to provide a wheel which will carry out in a proper manner these various functions.

A further object of the invention is to provide simple, efficient and dependable resilient means for the wheel. Other objects of the invention will be apparent from a consideration of the accompanying drawings and the following description thereof.

Of the drawings Figure 1 is an elevation partly in section, of a wheel which embodies the features of my invention. Fig. 2 is a central view of the wheel, more or less diagrammatic, showing the relation of the various parts when the wheel is in use. Fig. 3 is a section along the line 3—3 of Fig. 1. Fig. 4 is a section along the line 4—4 of of Fig. 1, and Figs. 5 and 6 are plan views of certain members of the wheel.

The wheel comprises the ordinary hub 10, spokes 11 and felly 12. The felly may be made of wood or any suitable material; I prefer for the purpose, in this instance, a wooden felly having a rim 13 of metal, the rim being composed in this instance of channel iron having flanges 14 projecting outwardly. Mounted on this rim are a plurality of housings 15 equally spaced about the periphery of the rim, and set in depressions 16 in the flanges 14, in order to prevent circumferential movement between the housings and the rim. Within each housing is a friction plate 17 which rests upon the outer surface of the channel, and is held in place circumferentially by means of flanges 18 fixed to the housing. A roller bearing 19 is placed in each of the housings, and is adapted to roll on the friction plate 17 in the runway limited by the shoulders 20 of the flanges 18. Above the roller is a second friction plate 21 held firmly in place in the housing by means of the flanges 22 projecting from the ends of the plate 21. A strap spring 23 is positioned in each housing between the roller 19 and the plate 21, extending outwardly in either direction with its ends rotatably supported by the bearings 24 in an outer rim 25. This outer rim has flanges 26 projecting inwardly beyond the flanges 14 and is composed of two pieces 28 and 29, held together by bolts 27. Any suitable tire may be placed over this outer rim and held in place by any ordinary or suitable means.

A consideration of Fig. 1 will show that, when the weight of the vehicle presses down on the wheel, the weight will be supported by the roller 19 which is beneath the hub; and which in turn will be supported by the spring 23. At the same time the springs above the hub will help support the weight by means of the friction plate 21 and the roof of the housing. The springs thus form cushioning means between the inner and outer rim of the wheel. In case of a sudden excessive downward thrust of the wheel, when the rebound from the spring occurs, a reverse action will occur with reference to both the lower and the upper springs; the spring on the upper portion of the wheel will be forced against the roller 19, and the lower spring will be forced against the roof of the housing. So that the springs will both act as cushioning means and as shock absorbers.

A consideration of Fig. 2 will show, if the wheel is rotating in the direction of the arrow, there will be a tendency for the inner rim to rotate ahead of the outer rim, and the rear shoulder 20 of each housing will push the roller forwardly and against the shoulder 30 limiting the end of a roller runway 31 formed in the spring 23, and the rotating of the outer portion of the wheel will depend upon this thrust of the shoulder 20 against the shoulder 30 by means of the roller, the springs in turn forcing the tire forward by means of the forward bearings 24. In case, at the same time, of a heavy downward pressure on the hub of the wheel, the inner and outer rims will become non-concentric, as indicated in Fig. 2, because the hub will pass downwardly with reference to the tire, and as a consequence the driving force of the wheel with reference to the tire will be carried by the forward or left-hand housing, while the shoulders 20 and 30 in the other housings will tend to separate as indicated in the figure. As a consequence there will be a relative movement of the springs 23 and the housings when the housings pass downwardly between the wheel and the road-bed and, hence, just at the time when the greatest downward force on the springs occur. But by means of the roller 19, the friction accompanying this relative movement is reduced to a minimum.

In case of skidding or other cause of a tendency to move the rims relatively transversely, the springs will prevent such movement. As each spring has its ends journaled in the channel of the outer rim, and its central portion supported by the flanges of the inner rim, relative transverse movement of the rims is prevented. In order to remove the outer rim it may be made in any suitable sections. I prefer to make the rim in two similar sections 28 and 29 held together by bolts 27 which are positioned between the ends of the springs where the greatest separating stress occurs.

It will thus be seen that by the means which I have illustrated and described I provide cushioning means and shock absorbing means and also suitable means for taking care, without excessive wear, of the torsional or circumferential effects and also the transverse effects of the inner rim on the outer rim. Any suitable tire may be placed on the outer rim of the wheel, in any ordinary or suitable manner, but as such a tire is not material to the merits of my invention it has not been shown herewith.

I claim as my invention:

1. In a spring wheel an outer rim, an inner rim, a plurality of rollers, and a plurality of flat springs, the ends of each of said springs being journaled in one of said rims, each of said springs having a runway with limiting stops at both ends thereof formed in its central portion, and one of said rollers being positioned in said runway between said spring and the other rim.

2. In a spring wheel two rims, a plurality of rollers, and a plurality of flat springs, one of said rims being larger than the other, and said rims being normally concentric, the ends of each of said springs being journaled in one of said rims, and each of said springs having a runway with limiting shoulders between its ends, and a plurality of means fixed to the other rim and forming a runway with limiting shoulders, each of said spring runways facing one of said rim runways, and a roller positioned in each pair of facing runways.

3. A spring wheel comprising two concentric rims, the inner rim having recesses in its periphery, a plurality of substantially straight flat springs, the ends of each of said springs journaled in brackets in the outer rim, housings fixed in said recesses to said inner rim, an intermediate portion of each of said springs being positioned in one of said housings, whereby radial movement of said intermediate spring portion away from said inner rim is prevented by the roof of said housing.

4. A spring wheel comprising two concentric rims, a plurality of substantially straight flat springs, the ends of each of said springs journaled in brackets in the outer rim, housings fixed to said inner rim, an intermediate portion of each of said springs being positioned in one of said housings, whereby radial movement of said intermediate spring portion away from said inner rim is prevented by the roof of said housing, and a friction plate between said spring and said housing roof, each of said housings being substantially the same width as said inner rim.

5. A spring wheel comprising two concentric rims, a plurality of substantially straight flat springs, the ends of each of said springs journaled in brackets in the outer rim, housings fixed to said inner rim, an intermediate portion of each of said springs being positioned in one of said housings, whereby radial movement of said intermediate spring portion away from said inner rim is prevented by the roof of said housing, and a roller between said intermediate spring portion and said inner rim.

In testimony whereof, I hereunto set my hand.

OTTO G. WORSLEY.

Copies of this patent may be obtained for five cents each, by addressing the "Commissioner of Patents, Washington, D. C."